US006408749B1

(12) United States Patent
Schaum

(10) Patent No.: US 6,408,749 B1
(45) Date of Patent: Jun. 25, 2002

(54) GEAR TRANSMISSION FOR DRIVING A PRINTING PRESS

(75) Inventor: Frank Schaum, Neckargemünd (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 09/428,182

(22) Filed: Oct. 27, 1999

(30) Foreign Application Priority Data

Oct. 27, 1998 (DE) ........................................ 198 49 382

(51) Int. Cl.$^7$ .......................... B41F 13/00; F16H 57/04

(52) U.S. Cl. .......................... 101/212; 101/216; 74/467

(58) Field of Search ................................ 101/212, 213, 101/216, 217, 183, 18, 174, 177, 141–142; 74/467, 325

(56) References Cited

U.S. PATENT DOCUMENTS 2,447,887 A * 8/1948 Worthington ............... 101/216
3,398,681 A * 8/1968 Hiruse ........................ 101/216
4,213,388 A * 7/1980 Geretzki ..................... 101/216
4,686,898 A * 8/1987 Lamanna et al. ............. 101/18
4,848,518 A * 7/1989 Ornberg et al. ............... 74/467
5,148,715 A * 9/1992 Blaser et al. ................. 74/325
5,181,468 A * 1/1993 Borel ......................... 101/216
5,671,670 A * 9/1997 Takahashi et al.

FOREIGN PATENT DOCUMENTS

| | | | |
|---|---|---|---|
| DE | 1237140 | | 3/1967 |
| DE | 123793 | | 1/1977 |
| DE | 3224267 | A1 | 12/1983 |
| DE | 4136195 | C1 | 7/1993 |
| JP | 0270594 | * | 5/1998 |

* cited by examiner

*Primary Examiner*—Eugene Eickholt
(74) *Attorney, Agent, or Firm*—Laurence A. Greenberg; Werner H. Stemer; Ralph E. Locher

(57) ABSTRACT

A gear transmission for driving a printing press, with a plurality of gear pairs formed of mutually meshing gear-wheels disposed operationally in a power-flow, at least one of the gear pairs being more heavily loaded than the rest thereof during operation, includes a case wherein the gear-wheels forming the at least one, more heavily loaded gear pair are enclosed, the rest of the gear pairs being disposed outside the case.

5 Claims, 2 Drawing Sheets

GEAR TRANSMISSION FOR DRIVING A PRINTING PRESS

BACKGROUND OF THE INVENTION

FIELD OF THE INVENTION

The invention relates to a gear transmission for driving a printing press with a plurality of gear pairs formed of mutually meshing gearwheels disposed operationally in a power-flow, at least one of the gear pairs being more heavily loaded than the rest thereof during operation, and also a printing press equipped with the gear transmission.

A gear transmission of the type referred to at the introduction hereto has become known heretofore from the state of the art as exemplified by the published German Patent Document DE 41 36 195 C1, which describes a sheet-processing rotary printing press having printing units formed by printing unit cylinders disposed one after the other in series or tandem, driving power therefor being introduced via a so-called driving printing unit within the series of printing units. The printing units are driven with the aid of a continuous gear train that is made up of gearwheels fixed to the respective printing cylinders against relative rotation therewith. In the driving printing unit, a drive pinion meshes with a selected gearwheel within the train of gears.

At the selected gearwheel, the power supplied through the drive pinion is operationally divided into a part supplying a preceding number of printing units in the series, and a part supplying a number of printing units succeeding the preceding number of printing units in the series. A gear pair formed by the selected gearwheel and the drive pinion is therefore subject to higher operational loads than the remaining gearwheels.

Up to a certain limiting value for the power required to be supplied, a gear transmission of the foregoing general type can be lubricated by low-viscosity grease. All that is required therefor is a metering device for the low-viscosity grease, and devices for collecting the quantities thereof which drip off. If the amount of power to be supplied exceeds a given value, however, adequate lubrication cannot be guaranteed using low-viscosity grease. In this case, resort must be had to a circulating-oil lubricating system. This is associated with considerable construction outlay since the lubricating oil must be channelled in closed spaces. According to the state of the art, this is effected by forming the side components bearing the printing cylinders as box-shaped side walls which oil-sealingly surround the gearwheel train as has become known, for example, from the published German Patent Document DE 32 24 267 A1. This is associated in particular with a relatively high outlay or expense in the casting-technology field in order to solve the problem of mutual sealing and mutual arrangement of the succeeding or consecutive side walls, as can be seen, for example, from Patent No. 123 793 of the former German Democratic Republic.

SUMMARY OF THE INVENTION

It is accordingly an object of the invention to provide a gear transmission for driving a printing press, that is of the type described at the introduction hereto, that reduces the outlay necessary for providing adequate lubrication, for the case wherein an application or injection of a relatively high driving power makes a circulating-oil lubricating system necessary.

With the foregoing and other objects in view, there is provided, in accordance with a first aspect of the invention, a gear transmission for driving a printing press, with a plurality of gear pairs formed of mutually meshing gearwheels disposed operationally in a power-flow, at least one of the gear pairs being more heavily loaded than the rest thereof during operation, comprising a case wherein the gearwheels forming the at least one, more heavily loaded gear pair are enclosed, the rest of the gear pairs being disposed outside the case.

In accordance with another feature of the invention, the gearwheels forming the at least one, more heavily loaded gear pair are a drive pinion and a driving gear.

In accordance with a further feature of the invention, the gearwheels include a drive pinion and two coaxial driving gears fixed together against rotation relative to one another, the case enclosing the drive pinion and a first one of the two driving gears meshing with the drive pinion.

In accordance with an added feature of the invention, a second of the two driving gears is a component of a gear train that includes the rest of the gearwheels.

In accordance with a concomitant aspect of the invention, there is provided a printing press with a gear transmission for driving the printing press, the gear transmission having a construction including one or more of the foregoing features.

In this way, it is possible to realize a circulating-oil lubricating system for lubricating the more highly or heavily loaded gear pair, the lubricating system being effective only for this gear pair. The outlay for ensuring adequate lubrication under conditions wherein a relatively high drive power is supplied is thus reduced considerably compared with that of the state of the art described hereinabove. With the relatively low outlay described at the introduction hereto, a low-viscosity grease lubricating system can be provided for the less loaded gearwheels arranged outside the case, whereas an oil bath for lubrication of the more highly loaded gear pair is provided simply inside a single case, which represents a fractional part of the box-shaped side walls heretofore known in the state of the art. In this regard, appropriate sealing of the case provided in accordance with the invention also prevents mixing of the different lubricants which are used. The measures for attaining a seal of this type are therefore limited to a negligibly small area in comparison with the box-shaped side wall provided according to the state of the art.

Other features which are considered as characteristic for the invention are set forth in the appended claims.

Although the invention is illustrated and described herein as embodied in a gear transmission for driving a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

DESCRIPTION OF THE PREFERRED EMBODIMENTS

Figure 1:
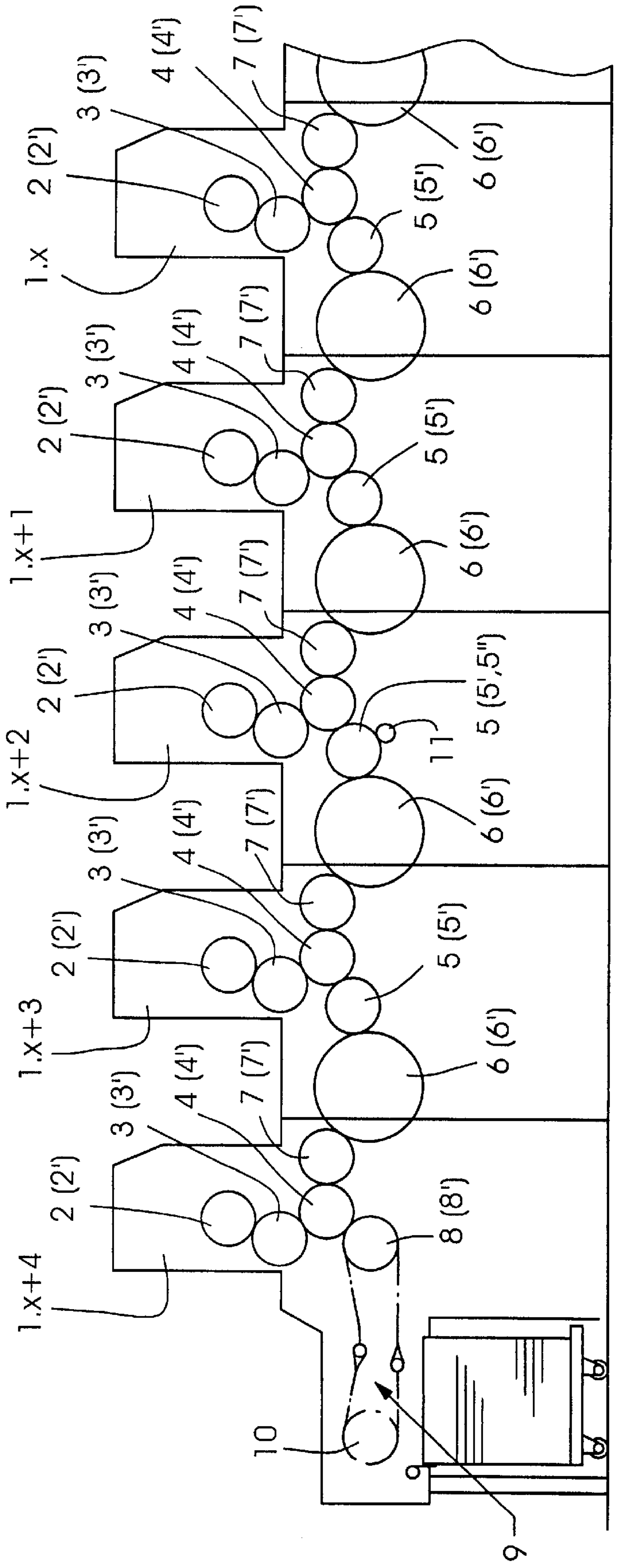
FIG. 1 is a fragmentary diagrammatic side elevational view of a printing press with a series or in-tandem arrangement of successive printing units including, located within the series arrangement, a so-called driving printing unit via which driving power is supplied during operation.

Referring now to the drawings and, first, particularly to FIG. 1 thereof, there is shown therein diagrammatically, in series or tandem, successively or consecutively arranged printing units 1.x, 1.x+1, 1.x+2, 1.x+3 and 1.x+4 representing an exemplary embodiment of a sheet-processing rotary printing press operating in accordance with the offset process, and executing a transfer of sheets from a respective preceding printing unit to a respective following printing unit through the intermediary of drums or cylinders equipped with gripper systems. Accordingly, each of the respective printing units 1.x to 1.x+4 includes an inking unit (not illustrated in FIG. 1) or, in the wet offset process, a dampening unit (not illustrated in FIG. 1), and printing unit cylinders in the form of a plate cylinder 2, a blanket cylinder 3 and an impression cylinder 4, and, between a preceding one of the printing units 1.x to 1.x+4 and a following one thereof, there is arranged, in each case, a first transfer drum or cylinder 5 for accepting a respective sheet from the impression cylinder 4 of the preceding printing unit, a storage drum 6 for accepting the sheet from the first transfer drum or cylinder 5 and a second transfer drum or cylinder 7 for accepting the sheet from the preceding storage drum 6, the transfer drum 7 transferring the respective sheet to the impression cylinder 4 of the following printing unit. In this arrangement, at least one sheet transfer device formed by the first and the second transfer drums 5 and 7 and the storage drum 6 is preferably constructed as a reversing or turning device convertible or switchable from a first operating mode to a second operating mode, and from the second operating mode into the first operating mode, so that the second transfer drum 7 passes a sheet on to the succeeding impression cylinder 4, with the leading edge of the respective sheet leading in the first operating mode and, with the respective sheet reversed or turned and with the trailing edge of the sheet leading in the second operating mode.

The impression cylindebr 4 of the last printing unit, which is the printing unit 1.x+4,in this example, is followed by a delivery drum 8 that, during normal operation, drives a revolving gripper system 9 conveying the sheets, which are transferred, during normal operation, to a first printing unit by a feeder drum (not shown in FIG. 1), out of the rotary printing press.

For loading the feeder drum with sheets, there is provided a swinging pre-gripper device (not shown in FIG. 1) that, through the intermediary of a decollating device, accepts individual sheets taken from a feeder pile aligned on a feeder table by an aligning device at front and side marks of the feeder table (not shown in FIG. 1) and conveys them to the feeder drum.

For driving the printing unit cylinders, the drums, the sheet transferring systems, those parts of the inking and dampening rollers which are not driven by friction, the delivery drums, the feeder drums, the gripper device, the aligning device and the collating device, a connected gear transmission is provided which, in this example, essentially comprises mutually meshing gearwheels, whereas chain drives are provided simply for driving reversing wheels 10 of the gripper system 9 in connection with the delivery drum 8, and the decollating device in connection with the feeder drum.

The mutually meshing gearwheels, as illustrated in FIG. 1, are represented as a respective gearwheel 2' assigned to a respective plate cylinder 2, a respective gearwheel 3' assigned to a respective blanket cylinder 3, a respective gearwheel 4' assigned to a respective impression cylinder 4, a respective gearwheel 5' assigned to a respective first transfer drum 5, a respective gearwheel 6' assigned to a respective storage drum 6, a respective gearwheel 7' assigned to a respective second transfer drum 7, and a gearwheel 8' assigned to the delivery drum 8.

It is readily apparent that each of the gearwheels 2' to 8' is fixed firmly to the respective cylinder or drum 2 to 8 to which it is assigned, and the gearwheel and the respective cylinder or drum are fixed against rotation relative to one another, so that in the diagrammatic view of the printing press in FIG. 1, each of the respective gearwheels 2' to 8' is represented, in the same way, as the corresponding cylinder or corresponding drum 2 to 8.

All of the aforementioned gearwheels form a connected gear train with a main line or trace that, in the example illustrated in FIG. 1, extends from the printing unit 1.x+4 constructed as delivery printing unit, over all of the preceding printing units, and with side strings or traces branching off from the gearwheel 4' driving a respective impression cylinder 4, and driving respective printing unit cylinders formed as a respective blanket cylinder 3 and a respective plate cylinder 2, together with non-illustrated inking-unit rollers and, possibly, non-illustrated dampening-unit rollers. The printing unit 1.x+4 is referred to herein as a delivery printing unit because it is connected to a gripper system 9 serving the delivery of the printed sheets, the gripper system 9 being driven by the gearwheel 8' of the delivery drum 8 meshing with the gearwheel 4' of the impression cylinder 4 of the printing unit 1.4+x.

In this exemplary embodiment, the printing unit 1.x+2 forms a so-called driving printing unit, which means that the drive power for operating the rotary printing press is fed through a gearwheel belonging to the printing unit 1.x+2, in this case through the gearwheels 5' driving one of the first transfer drums 5, that gearwheel 5' meshing in particular with the gearwheel 4' assigned to the impression cylinder 4 of the printing unit 1.x+2 and in addition with that one of the gearwheels 6' that is assigned to the storage drum 6 on the printing unit 1.x+2, that is located in the direction towards the succeeding printing unit 1.x+3.

Thus, at the gearwheel 5' assigned to the printing unit 1.x+2 the power flow supplied to the rotary printing press branches off, partly flowing to the delivery printing unit 1.x+4 and partly flowing to the printing unit 1.x, and finally supplies the pre-gripper device, the aligning device and the decollating device. The gearwheel 5' causing the power flow to branch out, therefore, represents a driving gear which is a component of the aforementioned gear train formed by all of the gearwheels 2' to 8' meshing mutually with one another in this exemplary embodiment, as illustrated in FIG. 1.

Figure 2:
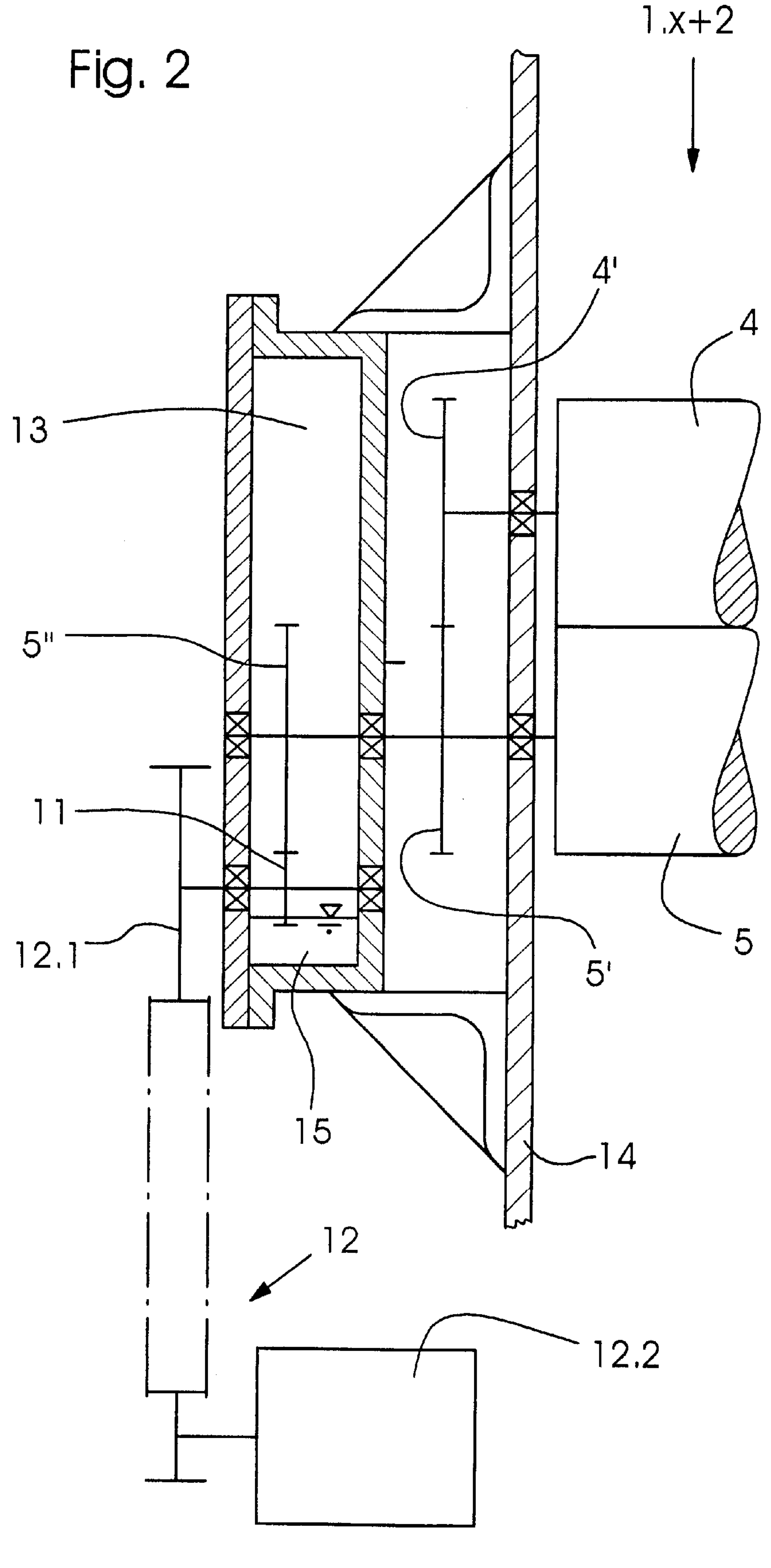
FIG. 2 is a diagrammatic front elevational view, partly in section and partly broken away, of an enclosed gearwheel pair and the integration thereof into a plurality of gearwheels disposed operationally within a power flow.

As can be seen in FIG. 2, an additional driving gear 5'' is coaxially fixed to the driving gear 5' at which the power flow branches off, so that the two driving gears 5' and 5'' are fixed against rotation relative to one another. The additional drive gear 5'' meshes with a drive pinion 11. The latter is fixed to a driving gear 12.1 of a belt drive 12 against rotation relative to the driving gear 12.1, the belt drive 12 being driven by a motor 12.2, and being preferably a toothed belt drive.

Although, according to the exemplary embodiment illustrated in FIG. 2, the additional driving gear 5'' is represented in FIG. 1 in the same way as is the driving gear 5' causing the power flow to branch and belonging to the driving printing unit 1.x+2, FIG. 2 is presented primarily to provide an understanding of the functional connection, described hereinbefore, between the driving pinion 11 and the driving gears 5' and 5" belonging to this printing unit. In this regard, the gear pair formed of the additional driving gear 5" and the driving pinion 11 clearly constitute a gear pair within the gear train driving the rotary printing press, and that gear pair being subject to higher loads than the remaining gear pairs of the gear train. In accordance therewith, the additional driving gear 5" and the driving pinion 11 are enclosed in a case or housing 13 while the remaining gearwheels are arranged outside the case 13. Of the remaining gearwheels forming the aforedescribed gear train, FIG. 2 illustrates only a part thereof belonging to the driving printing unit 1.x+2, indeed, the driving gear 5' of the first transfer drum 5, and the gearwheel 4' driving the impression cylinder 4 of the driving printing unit 1.x+2, and meshing with the driving gear 5'.

The housing or case 13 illustrated only in FIG. 2, in the interest of clarity, is supported, in this exemplary embodiment, by a side wall 14 that bears, in particular, the cylinders and drums of the printing press and the aforementioned gear train, the cylinders and drums, on the one hand, and the gear train, on the other hand, being arranged on opposite sides of the side wall 14.

A non-illustrated low-viscosity grease lubricating system realized with little outlay is provided for the gear train, the lubricant of the lubricating system being kept away from the cylinders and drums of the printing units by the protective screening formed by the side wall 14. Lubrication of the gear pair formed by the drive pinion 11 and the additional driving gear 5", that gear pair being more heavily or highly loaded than the gear pairs of the gear train, is performed with a suitable lubricating oil provided in the form of an oil bath 15 inside the case or housing 13. For this purpose, the case 13 is constructed in a conventional, heretofore known oil-tight manner so as to exclude any mixing of the different lubricants provided for lubricating the gear train as a whole.

I claim:

1. A gear transmission for driving a printing press, comprising:

a plurality of gear pairs formed of mutually meshing gearwheels disposed operationally in a power-flow, at least one of said gear pairs being more heavily loaded than a rest thereof during operation; and a case encapsulating said gearwheels forming said at least one, more heavily loaded gear pair and the rest of the gear pairs being disposed outside said case.

2. The gear transmission according to claim 1, wherein the gearwheels forming the at least one, more heavily loaded gear pair are a drive pinion and a driving gear.

3. The gear transmission according to claim 1, wherein the gearwheels include a drive pinion and two coaxial driving gears fixed together against rotation relative to one another, said case enclosing said drive pinion and a first one of said two driving gears meshing with said drive pinion.

4. The gear transmission according to claim 3, wherein a second of said two driving gears is a component of a gear train that includes the rest of the gearwheels.

5. A printing press with a gear transmission for driving the printing press, the gear transmission having a construction according to claim 1.

* * * * *